Dec. 12, 1939.     H. NEGBAUR     2,183,382
BATTERY OPERATED LIGHTER
Filed June 3, 1939
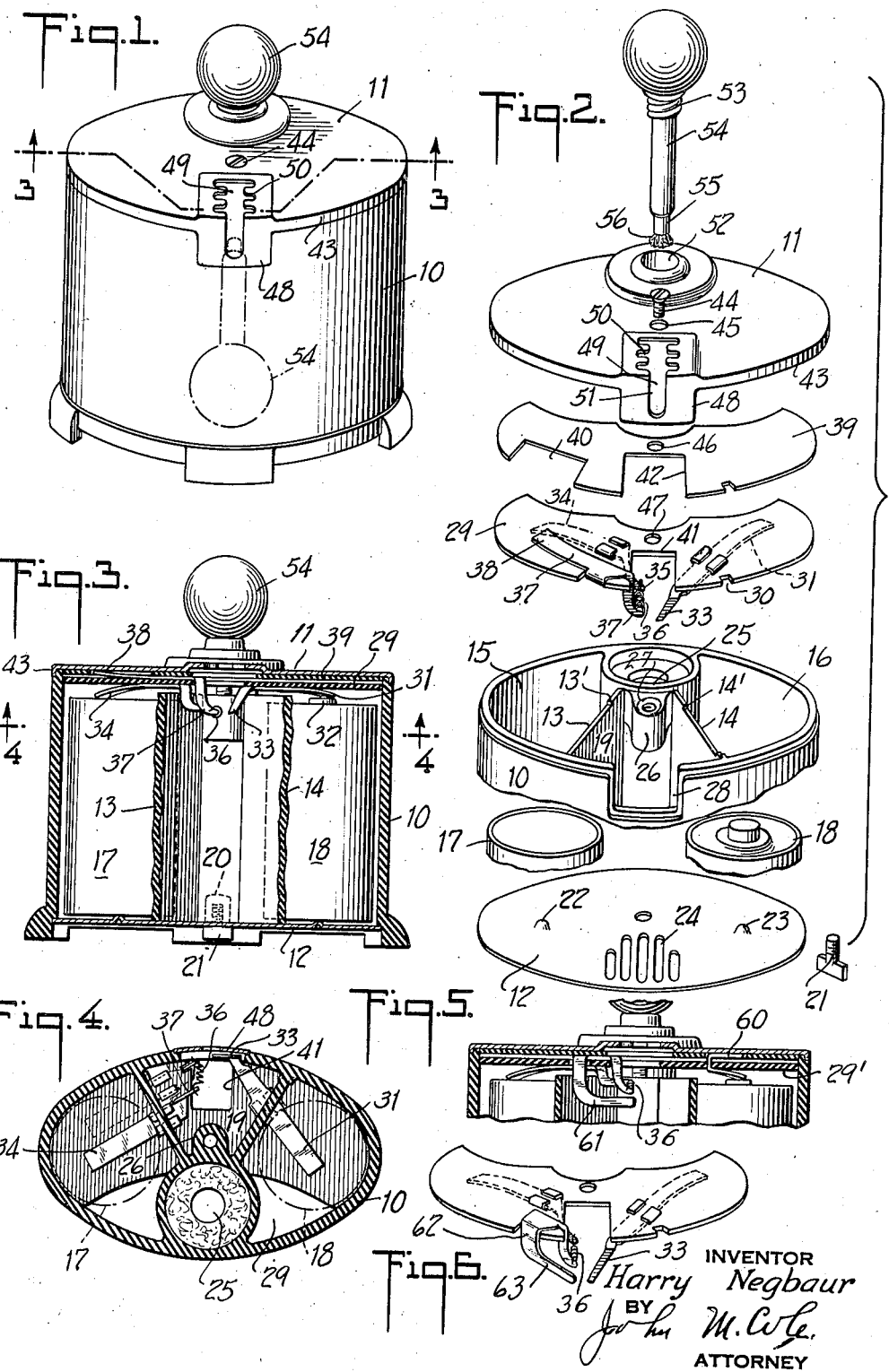
INVENTOR
Harry Negbaur
BY
John M. Cole
ATTORNEY Patented Dec. 12, 1939

2,183,382

UNITED STATES PATENT OFFICE 2,183,382

BATTERY OPERATED LIGHTER

Harry Negbaur, New York, N. Y.

Application June 3, 1939, Serial No. 277,200

18 Claims. (Cl. 175—296)

The present invention relates to battery operated lighters, and is more particularly directed toward battery operated lighters having an enclosed electric heating coil with circuit connections to the battery, whereby a torch having a fuel carrying wick at the end and a conducting element near the wick may be ignited by being inserted into a suitable opening in the lighter to bring the conducting element on the torch adjacent the contacts and the wick adjacent the coil.

According to the present invention the heating coil is fixedly mounted inside the device so as to minimize the likelihood of an injury and possibility of its being shifted or moved out of position while hot, so that the device will have a long useful life.

The present invention contemplates a lighter of the type above referred to having a suitable attractively shaped casing into which the dry cells and electrical contacts may be inserted. The device is provided with a cover member apertured to receive the torch and to guide the torch so that the circuit may be completed.

In its preferred embodiment the present invention employs a casing with two battery receiving compartments, a fuel receiving well and a draft passage extending up past the heating coil. All the parts are designed so as to be capable of inexpensive manufacture, and easy assemblage so that the user can readily replace the dry cells without any possibility of injuring or disturbing the heating coil.

Other and further objects will appear as the description proceeds.

The accompanying drawing shows, for the purposes of illustrating the present invention, one of the many embodiments in which the invention may take form, together with modifications of certain parts, it being understood that the drawing is illustrative of the invention rather than limiting the same.

In the drawing:

Figure 1 is a perspective view of a battery operated lighter;

Figure 2 is an exploded perspective view showing the parts;

Figure 3 is a sectional view taken on the broken line 3—3 of Figure 1;

Figure 4 is a cross sectional view taken on the line 4—4 of Figure 3;

Figure 5 is a fragmentary sectional view similar to Figure 3 showing a modification; and Figure 6 is a perspective view of a modified form of conductor carrying plate.

The device has a casing made up of an insulating body member 10, a metal cover member 11, and a metallic bottom plate 12. These may conveniently be of oval shape, as shown in the drawing. The body member 10 has oval side walls and vertical partition walls 13 and 14 which provide two lateral compartments 15 and 16 for dry cells indicated at 17 and 18. Between the partition walls 13 and 14 is a flue chamber 19.

The insulating body is provided with a lower threaded insert 20 to receive a thumb screw 21 which is employed to secure the bottom plate 12 in position. This plate has projections 22 and 23 to press against the contacts on the battery cells and has openings 24 below the flue passage 19. The rear of the insulating body has a fuel receiving well 25 and just in front of this well is a lug 26 carrying a threaded insert 27. The front wall of the body member is notched as indicated at 28.

An insulating plate 29 is made of the proper shape to fit inside the casing walls and rest on top of the partition walls 13 and 14. These walls may be cut back, as indicated at 13' and 14' to align the plate 27, and the plate may be notched, as indicated at 30, to facilitate aligning the parts. The insulating plate 29 carries a fixed contact strip 31 which is adapted to engage the upper terminal 32 of the cell shown on the right of the drawing. This strip extends downwardly below the plate 29 to provide a contact such as indicated at 33. Another conducting strip 34 is secured to the plate 29 and it extends downwardly, as indicated at 35, where it is connected with one end of a heater coil 36. The front end of this heater coil is connected to another conducting strip 37 secured to the upper side of the insulating plate 29 and extending rearwardly as indicated at 38.

A second insulating plate or sheet 39 is placed on top of the sheet 29 so as to cover the attaching prongs by which the contacts 31 and 34 are secured to the plate 29. The plate 39 is notched as indicated at 40 to accommodate the spring contact 38. The insulating plates 29 and 39 are notched as indicated at 41 and 42 to provide access to the heating coil.

The cover 11 may be made in the form of a sheet metal stamping and has a downwardly extending peripheral lip 43 to fit about the top of the insulating body. The cover member is secured to the insulating body by a screw 44 passing down through aligned holes 45, 46 and 47 and threaded into the insert 27. The cover member has a downwardly extending flange 48 adapted to fit into the notch 28 in the body member and to be spaced in front of the contacts 33 and 37. This flange, together with the adjacent part of the top of the cover 11, is provided with an opening indicated at 49. The upper part of this opening is serrated as indicated at 50, while the lower part 51 is of the proper diameter and length to receive the conducting element on the torch to be described.

The cover member 11 also carries a threaded element 52 adapted to receive a thread 53 on a torch 54. This torch has a conducting element 55 and a wick 56. When the torch is in the position shown in full lines in Figures 1 and 3, it is housed in the well 25 and the wick may be wetted by the fuel carried therein. When it is desired to ignite the torch it is moved to the dot-and-dash line position of Figure 1 so that the conducting element 55 passes down through the portion 51 of the slot or opening, thereby making contact with the metal cover and also making contact with the terminal 33 so as to complete the circuit from the cell 13 through the contact 34, the wire coil 36, the contacts 37, 38, the cover 11, contact 33, strip 31 to the other battery terminal. The wire coil is heated and this ignites the fuel. The flame is readily propagated as the air can pass up through the flue provided by the holes 24, the space 19 and the opening in the cover. When the lighted torch is withdrawn it passes out through the openings without extinguishing the flame, as the openings are made large enough to pass the burning torch without quenching it.

It will be noted that the coil is enclosed inside the device in such a way that there is very little likelihood of injuring the coil when the torch is inserted and there is no jarring or disturbance of the coil when heated which might cause it to sag or get out of place.

In testing out the device shown in Figures 1 to 4, inclusive, it is not necessary to have the cover 11 in place, as the conducting element 55 on the torch can bridge the gap between the elements 37 and 33.

Instead of arranging the electrical connections as shown and described above in detail, it is possible to rearrange them as shown in either Figure 5 or 6 without making substantial change in the structural parts employed. Figure 5 shows an arrangement in which the contact 60 corresponding with the contact 31 is so arranged as to directly connect the upper terminal of the right-hand cell to the metallic cover. In this case the conducting strip 61 corresponding with the conducting strip 37 is carried on the upper side of the insulating plate 29', and the end of this conducting strip is engaged by the conducting element on the torch so that the current flows from the coil support through the torch carried element to the cover plate.

In the arrangement shown in Figure 6 the conducting strip 62 which supports the coil 36 in a manner similar to the conducting strip 37 is provided with an additional extension or terminal 63 adapted to be disposed opposite the terminal 33 (which may be the same as shown in Figure 2) so that the gap between the parts 63 and 33 may be bridged by the conducting element on the torch. In this arrangement the conducting elements are completely insulated from the cover member 11 and this member need not be made of metal.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. A battery operated lighter comprising a casing having a torch admission opening in the top thereof, a torch adapted to enter said opening and having a fuel carrying wick at the end and a conducting element near the wick, a dry cell battery in the casing, a contact connected to one terminal of the battery and disposed in the casing to be engageable by the conducting element on the torch when it is inserted into the opening, a heater coil having one end connected with the other battery terminal and disposed within the casing to be protected thereby and adjacent the wick when the torch is inserted, and a second contact connected with the other end of the coil and disposed relative to the first to be engaged by the conducting element on the torch.

2. A lighter such as claimed in claim 1, wherein the coil is directly below the opening so that the flame may pass up through the opening.

3. A lighter such as claimed in claim 1, wherein the opening in the casing extends rearwardly and downwardly from the upper front corner.

4. A lighter such as claimed in claim 1, wherein the coil is directly below the opening so that the flame may pass up through the opening, and the opening has a serrated contour to limit the size of an object which may be inserted thereon and provide space through which to withdraw the lighted torch without quenching the flame.

5. A lighter such as claimed in claim 1, wherein the casing has a flue extending upwardly past the coil so that the flame on the torch may receive fresh air.

6. A lighter such as claimed in claim 1, wherein the casing includes a metallic cover member which provides the opening for the torch, said member forming one of the contacts.

7. A lighter such as claimed in claim 1, wherein the casing includes a metallic cover member which provides the opening for the torch, said member forming the second contact.

8. A lighter such as claimed in claim 1, wherein the coil and the two contacts are carried on an insulator enclosed in the casing.

9. A battery operated lighter comprising a torch having a fuel carrying wick at the end and a conducting element near the wick, a casing having an insulating body having two dry cell receiving compartments open at the top and bottom, dry cells in said compartments, a conducting plate at the bottom for electrically connecting the lower cell terminals, an insulating plate disposed across the top of the cells and carrying two contacts connected to the respective upper terminals of the cells and a heater coil connected to one of said contacts and a third contact connected to the other end of the coil, a cover for the casing, the cover having a torch receiving opening adjacent the coil, and electrical connections from the said third contact and from the other of said first mentioned contacts both disposed relative to the opening so as to be bridged by the conducting element on the torch when the torch is inserted to bring the wick near the coil.

10. A lighter such as claimed in claim 9, wherein the coil and bridged electrical connections are below the insulating plate and the plate has a notch to accommodate the torch.

11. A lighter such as claimed in claim 9, wherein the conducting plate is apertured below the coil to permit air to circulate up past the coil.

12. A battery operated lighter comprising a torch having a fuel carrying wick at the end and a current conducting element spaced from the wick, an insulating casing having two dry cell receiving compartments open at the top and bottom, dry cells in said compartments, a closure plate at the bottom for electrically connecting the lower terminals of the cells, an insulating plate extending across the tops of the cells, a conductor carried by said insulating plate and in engagement with one of the upper cell terminals, a heating coil connected to said conductor, a cover extending across the top of the casing and having a torch receiving opening adjacent the coil, a second conductor insulated from the first conductor and connected to the other end of the coil and extending adjacent the coil to be engaged by the conducting element on the torch when the wick is adjacent the coil, and a third conductor secured to the insulating plate engaging the other upper cell terminal and terminating in a position to be engaged by the conducting element on the torch when in said position.

13. A battery operated lighter comprising a torch having a fuel carrying wick at the end and a current conducting element spaced from the wick, an insulating casing having two dry cell receiving compartments open at the top and bottom, dry cells in said compartments, a closure plate at the bottom for electrically connecting the lower terminals of the cells, a conductor carried by said insulating plate and in engagement with one of the upper cell terminals, a heating coil connected to said conductor, a metallic cover extending across the top of the casing and having a torch receiving opening adjacent the coil, a second conductor insulated from the first conductor and connected to the other end of the coil and to the metallic cover, the cover having a wall adjacent the coil to be engaged by the conducting element on the torch when the wick is adjacent the coil, and a third conductor secured to the insulating plate engaging the other upper cell terminal and terminating in a position to be engaged by the conducting element on the torch when in said position.

14. A battery operated lighter comprising a torch having a fuel carrying wick at the end and a current conducting element spaced from the wick, an insulating casing having two dry cell receiving compartments open at the top and bottom, dry cells in said compartments, a closure plate at the bottom for electrically connecting the lower terminals of the cells, an insulating plate extending across the tops of the cells, a conductor carried by said insulating plate and in engagement with one of the upper cell terminals, a heating coil connected to said conductor, a metallic cover extending across the top of the casing and having a torch receiving opening adjacent the coil, a second conductor insulated from the first conductor and connected to the other end of the coil, the cover having a wall adjacent the coil to be engaged by the conducting element on the torch when the wick is adjacent the coil, and a third conductor secured to the insulating plate and contacting the cover.

15. In a battery operated lighter, a terminal assembly comprising an insulating plate, two conductors fixedly carried thereby and adapted to engage battery terminals, a resistance coil connected to one conductor, a third conductor secured to the plate and to the other end of the coil, the third conductor and the other battery connected conductor being separated by a narrow gap, and a torch having a wick and a conducting element adapted to bridge the gap to close the circuit when the wick is adjacent the coil.

16. A battery operated incandescent lighter having a casing provided with a torch receiving opening of irregular outline having protruding portions to limit the size of a member which can be inserted therethrough and provide room for withdrawing a lighted torch without quenching the flame, a normally open circuit heater coil below the opening, dry cells in the casing and circuit connections for the cells and coil.

17. In a battery operated lighter, a body member of insulating material open at the top and bottom and provided with two partition walls which form the interior into two compartments each adapted to receive a dry cell and a vertically extending flue.

18. In a battery operated lighter, a body member of insulating material open at the top and bottom and provided with two partition walls which form the interior into two compartments each adapted to receive a dry cell and a vertically extending flue, a bottom conducting plate to interconnect the lower terminals of the cells, a cover having a torch receiving opening, a heater coil fixedly mounted below the opening in the cover and having one end connected with one upper cell terminal, and connections from the other end of the coil and the other upper cell terminal spaced to be bridged by the torch when inserted in the opening.

HARRY NEGBAUR.